Oct. 9, 1956
R. T. GILLETTE
2,766,370
PROCEDURE FOR MAKING COMPOSITE METAL STRIPS
OR SHEET BY A CONTINUOUS PROCESS
Filed April 13, 1953
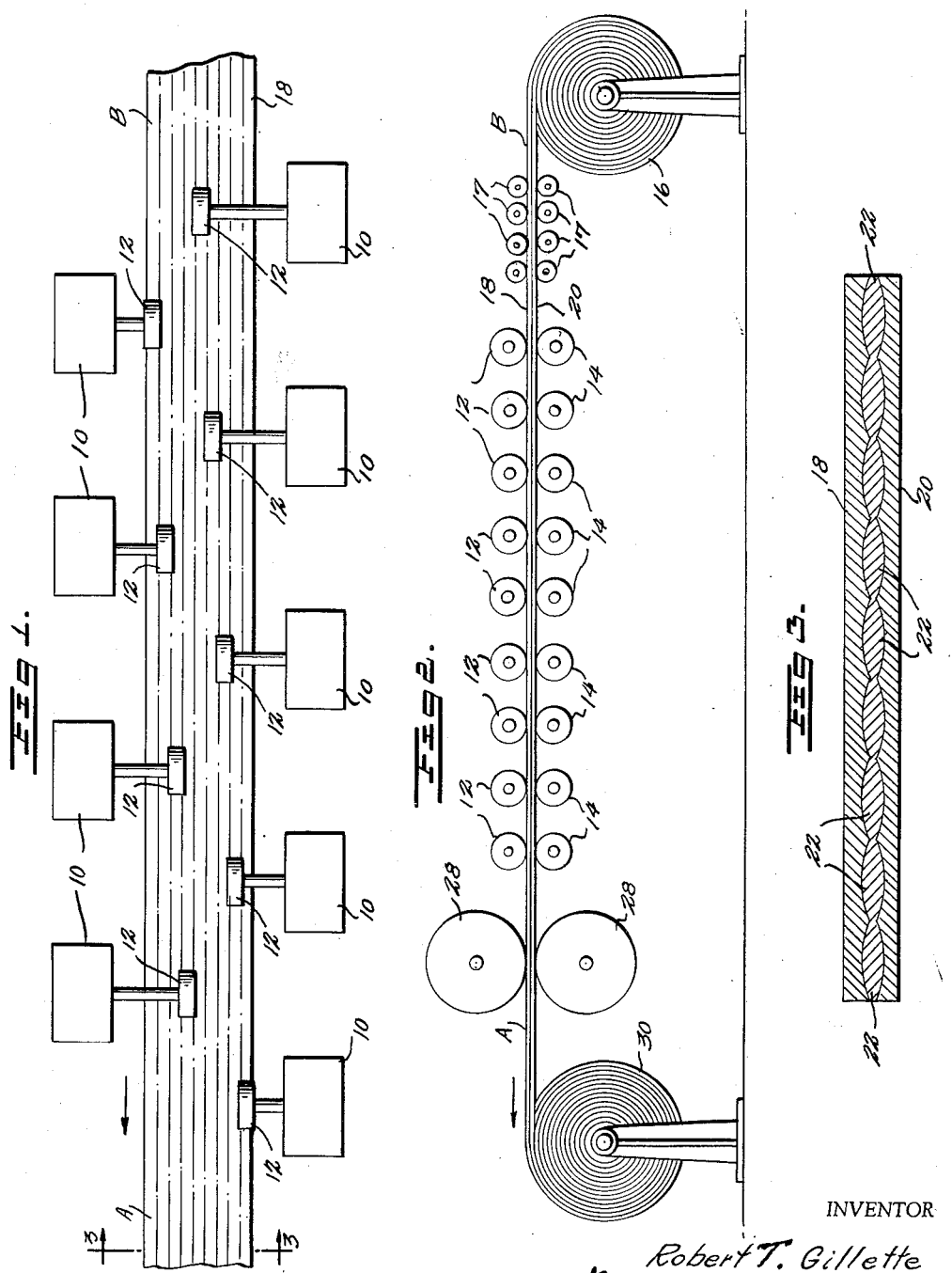
INVENTOR
Robert T. Gillette
BY Mason, Mason v Sheridan
ATTORNEY

United States Patent Office 2,766,370
Patented Oct. 9, 1956

2,766,370

PROCEDURE FOR MAKING COMPOSITE METAL STRIPS OR SHEET BY A CONTINUOUS PROCESS

Robert T. Gillette, Scotia, N. Y., assignor to MacMillan Clements, Bethel, Conn.

Application April 13, 1953, Serial No. 348,411

2 Claims. (Cl. 219—83)

This invention relates to the making of a bi-metal or multi-ply metal strip or sheet wherein strips or sheets of dissimilar metals or metals of the same kind but having dissimilar characteristics are fed to a strip welding machine means. Following the welding step, the strip or sheet is rolled to the proper thickness, depending upon the use to which the final product is to be put, and where necessary, it is annealed. Several rolling operations may be used in order to attain the proper strip or sheet thickness in the product.

An object of the invention, therefore, is to provide a method of bonding strips or sheets of material by seam welding the same in a continuous operation to form a composite strip or sheet in a single pass.

Another object is to weld composite metal strip or sheet by a continuous one pass process, the sheets being bonded to each other over their entire contacting areas.

A further object is to provide a procedure for continuously making multi-ply composite metal strip or sheet stock for use in the production of any desired gauge metal.

An additional object is to provide a method of forming a composite strip or sheet which is of such ductility that, after welding the same may be subjected to extensive rolling operations and other forming operations, such as pressing and cold deep drawing.

Other objects will appear hereinafter throughout the specification.

The procedure constituting the present invention may include the step of separately rolling strips or sheets of material, hereinafter termed strips, before the welding step. After welding, the composite strip may be rolled while still hot. One or more rolling operations may be used after the strip has become cooled.

The primary purpose of rolling after welding is to obtain the required gauge of the composite strip.

The most important feature of the invention relates to the welding step thereof, or the welding step combined with other steps hereinafter enumerated.

Great difficulty has heretofore been found in making a compound strip composed of different metals, or similar metals having different characteristics, which compound strip will withstand various forming operations, such as rolling, to provide a composite strip of very light gauge metal or which will withstand other pressing operations or cold deep drawing.

Strips of various kinds may be combined to form the composite strip. For instance, various stainless steels may be united with low carbon steel. In place of one of the steel strips or in addition to said steel strips, a copper or copper alloy strip may be used. One or more of these strips may be united with strips of other metals, such as nickel, Monel, inconel, various brasses, gilder's metal, and precious metals, such as gold, silver, platinum, irridium, or alloys of any of these metals. Substantially any combination of these and other metals in strip form may be combined. Certain metals, such as aluminum, titanium, or magnesium, are not susceptible of combination with strips of the above-noted or other metals, but strips made of alloys of one or more of them can be combined with such metal strips.

In carrying out the process of the present invention, the strips, or at least the faces of them which are in juxtaposed position when welding takes place, are thoroughly cleaned either mechanically or chemically, or both. For example, mechanical cleaning may be effected by sanding or subjecting the opposite faces to an emery wheel, and chemical treatment may be accomplished by a pickling treatment.

While the strips each may be rolled to proper gauge prior to the cleaning step, said strips can more probably be purchased in rolls of the proper gauge. It will be understood that the strips as they are fed to the welding machine means may be of the same, or of different gauges determined by the nature and extent of subsequent operations to be performed on the welded strip and of the final desired product.

The strips are then fed to the welding machine means which may consist of a plurality of separate seam welders arranged on the same or on opposite sides of the moving strips, or a single welding machine may be used which has a plurality of offset welding rollers. In any case, all contacting portions of the strips, i. e., the juxtaposed faces thereof, are joined over the entire contacting areas of the strips so that two or three strips lying on each other are guided by side guide rollers in exact vertical registry during the welding step.

This welding step is performed by drawing the strips by feed rollers adjacent the exit end of the welding means which feed the strips at a fixed speed. The welding is effected by resistance welding, the welding current passing from the upper to the lower welding rollers of each pair of welding rollers, the current passing through the sheets that are moving between these sets of rollers. Conversely, the current may pass from the lower to the upper welding wheel of each pair of wheels or alternating current may be used. Each pair of upper and lower rollers between which the sheets pass is preferably offset in a horizontal plane with relation to the next adjacent pair of rollers, in the path of movement of the sheets, so that a plurality of tangent or overlapping seams result whereby the entire contacting surface areas of the strips are seam welded to each other. A cross section of the welded strip will show a plurality of nuggets similar to the links of a chain in appearance. However, where the offset distance sidewise of the moving strips between the pairs of welding wheels is close, the nuggets partially or entirely merge with each other to form a continuous welding zone that joins the strips to each other from one side to the other of the strips and along the entire length thereof. The method of this invention includes the step of adjusting the offset relationship of the several pairs of welding rollers, but in all cases the instant method insures that the nuggets as viewed in vertical cross section will be connected to each other either by their tangency, or by their partial or total coalescence.

As heretofore stated, a plurality of resistance seam welding machines may be used. A typical arrangement may include four resistance seam welders on one side and five similar welders on the opposite side of the moving strip. The number of machines will depend upon the width of the moving strip and the width of the pairs of welding wheels. Preferably, no seam will be made in exact registry with a seam made by a pair of welding wheels in advance of another pair of welding wheels, except possibly when comparatively thick strips are being bonded to each other.

Generally speaking, the offset distance transversely of the strips between one pair of welding rollers and the next adjacent lateral pair of welding rollers will depend upon the thickness of the sheets and/or the rate of movement of the sheets past the welding roller pairs. By way of example, the speed of the strip can be adjusted to be between three to nine feet per minute, but said speed of said strip feed may be as slow as one foot per minute, such as when using alloy metal sheet or sheets, or as fast as fifteen to twenty-eight feet in other runs; for instance, when the metal sheets are of light gauge.

As shown in the drawings, the welding rollers are idler rollers; i. e., they are not driven. However, in some installations either one or the other of each pair of rollers may be driven by a variable speed motor through suitable reduction gearing. These rollers preferably are composed of copper or copper alloy and are fed by electric current in the order of about 10 volts and about 50,000 amperes. While this current value will be proper in some instances, the current value may be varied over a wide range, depending upon the thickness and the kind of metal of the sheets being welded. The current value of the welding machines is adjustable over a wide range by the use of tapped transformers and phase shifters as is well known in the art.

Although the welding machine means preferably welds continuously, under some circumstances said means may be provided with an interrupter as understood in this art.

The strip, during and shortly after welding, is subjected to a bath or spray of water to prevent warping of the strip, and prevent annealing as well as to increase the life of the welding rollers.

It will be appreciated that a continuous and even pressure is applied to the strip during the welding step. Conventional seam welding machines are usually provided with fluid means such as air cylinders for raising or lowering, and for applying pressure to the work by means of said welding wheels of the upper wheels of the several pairs of welding wheels. When the wheels are applied to the work or moving strip, the degree of pressure exerted thereon may be adjusted by manual adjustment of the fluid means in the well-known manner.

The strips which are fed to the welding machine means may consist of a low carbon steel strip and stainless steel strip whose gauges may vary between .015 to .025 inch to form a bi-metal strip, although other gauges may be used, as this depends upon the welding conditions and the final desired product. For instance, low carbon steel may vary from .050 inch to .125 inch or 1.150 inches or higher.

Following the welding step, the strip composed of dissimilar metals, or metals of like kind but having dissimilar characteristics (as in the use of low carbon steel and stainless steel supra), the strip is continuously rolled preferably while still hot. It may be permitted to cool, however, and then rolled. It can be annealed between successive rolling operations, in either its hot or cold condition.

By way of illustration, the apparatus diagrammatically shown in the accompanying drawings may be used, in which:

Figure 1 is a top plan view showing diagrammatically the strip feeding means and the welding machine means;

Figure 2 is a side elevation of the welding rollers and strip feeding means; and Figure 3 is an enlarged vertical section of a typical composite strip made by the present method, taken on the line 3—3 of Figure 1.

As will be noted by reference to Figure 1, the superposed sheets A are pulled to the left as indicated by the arrow in Figure 1. These sheets are propelled to the left by a set of pulling rollers and guided in properly aligned superposed position by a set of guiding rollers that engage the sides of the strips. Neither of these sets of rollers has been shown as they are well known to those skilled in this art.

The welding machine means includes a plurality of welding machines 10, each having welding rollers 12 forming the upper set of welding rollers and a second or lower set of welding rollers as is shown at 14.

As seen in Figures 1 and 2, the metal strips are fed from an uncoiler 16 to straightening rolls 17 between the pairs of welding rollers 12 and 14. This feeding is caused by the feed rolls 28. From the feed rolls, the welded strip moves to the coiler 30. The present invention is not concerned with the construction of the welding machine means which may be as illustrated, or the machines may be arranged on one side only of the moving strip. Alternately, a single machine may be used which supports a plurality of laterally offset pairs of welding wheels whereby the longitudinal abutting or overlapping seam welding step may be performed. Seam welders of the deep throat type are preferably used in order to permit wide adjustment across the work of the welding wheel pairs.

As seen in Figure 3, the upper and lower strips 18 and 20 have been bonded to each other by the nuggets 22. These nuggets are slightly more than tangent to each other, in that their sides overlap in a transverse direction. The nuggets overlap also in a longitudinal direction, or rather they form a strip in place of the series of nuggets shown in Figure 3. As stated above, the extent of overlap of the nugget sides transversely of the strip, depends upon the sidewise adjustment of the wheel pairs 12, 14 or the number of said wheel pairs which are used for a strip of a given width.

In addition to the overlapping transverse nuggets, in actual practice it has been found that the seam welders also form a series of nuggets extending longitudinally of the strip. The coalescence of said nuggets depends upon several factors including the speed of movement of the strips and/or the number of cycles per second of alternating current used. In some cases the longitudinal nuggets may be spaced from each other where the speed of the strip is quite high, approaching or exceeding one hundred feet per minute, and/or where the cycle changes are at a low rate per second.

Where sheets of dissimilar metal are welded to each other, it is usually necessary to provide an interrupter for each of the welding machines. Such an interrupter allows a series of brief cooling periods which alternate with the periods where welding heat is applied. This also causes the formation of longitudinal nuggets. In the present method the machines are so adjusted that the longitudinal nuggets coalesce in order that transverse and longitudinal series of nuggets will result in the welding of the superposed sheets over all, or substantially all of their contacting areas.

When the cycles are at a low rate of change per second, the effect of nugget formation is more pronounced. Also the nugget formation or overlap is in many cases controlled by the use of an interrupter, particularly in low speed strip travel.

Welding dissimilar metals sometimes requires a different type of welding roller on each side of the composite strip to effect a heat balance. As an example, if we were to weld stainless steel to copper using the same type of welding roller top and bottom, the high electrical resistance stainless steel would be overheated or burned before the low electrical resistance copper would become hot enough to weld to the stainless steel, as the same value of welding current must past through both strips. To obtain a heat balance in this case we would use a low electrical resistance roller in contact with the stainless steel and a high electrical resistance roller in contact with the copper, in this way getting the proper heat balance to make a weld. This is because the low resistance roller adds no heat from contact resistance but conducts heat away from the surface of the stainless steel, while the high electrical resistance roller in contact with the copper adds some heat to the copper from high contact resistance and conducts no heat from the surface of the copper.

Usually the electrical and heat conductivity of a metal follow each other quite closely. This is true in the case of most welding rollers. The case of welding stainless steel to copper is used as a good example of obtaining heat balance. However, the heat balance problem applies when welding any combinations of dissimilar metals and alloys.

The rolling and annealing mechanism used is well known and has been omitted from the drawings.

Certain mechanical expressions of the inventive idea involved are shown in the accompanying drawings, and specific language has been used in the specification. These are designed merely as illustrations to assist in the description of the invention and not as defining the limits thereof.

I claim:

1. The method of making composite metal strip from strips of dissimilar metals or metals of like kind but having dissimilar characteristics, which comprises the steps of feeding superposed strips of said metal to a welding station, arranging a plurality of welding means in offset relation to each other at said station, simultaneously welding said strips to each other along a plurality of seams and forming nuggets whose side edges contact each other longitudinally of said seams.

2. The method of making composite metal strip from strips or dissimilar metals or metals of like kind but having dissimilar characteristics, which comprises the steps of feeding superposed strips of said metal to a welding station, arranging a plurality of welding means in offset relation to each other at said station, simultaneously applying a plurality of seam welds by means of a plurality of pairs of welding wheels arranged in lateral offset relationship side-wise of said strips, maintaining a heat balance by using wheels of different electrical resistance in each pair of wheels, and forming nuggets whose sides are joined to each other transversely of the strips, applying pressure to said strips during the welding operation and applying water to said strips during and immediately after the welding operation to prevent warping of the strips.

References Cited in the file of this patent

UNITED STATES PATENTS

| | | |
|---|---|---|
| 1,254,411 | Kronenberg | Jan. 22, 1918 |
| 1,350,572 | Smith | Aug. 24, 1920 |
| 1,640,244 | McBerty | Aug. 23, 1927 |
| 2,040,038 | Wulf | May 5, 1936 |
| 2,214,002 | Trainer et al. | Sept. 10, 1940 |
| 2,515,176 | Armstrong | July 18, 1950 |